(12) United States Patent
Kurma et al.

(10) Patent No.: US 11,699,275 B2
(45) Date of Patent: Jul. 11, 2023

(54) METHOD AND SYSTEM FOR VISIO-LINGUISTIC UNDERSTANDING USING CONTEXTUAL LANGUAGE MODEL REASONERS

(71) Applicant: Tata Consultancy Services Limited, Mumbai (IN)

(72) Inventors: Sai Sree Bhargav Kurma, Pune (IN); Kanika Kalra, Pune (IN); Silpa Vadakkeeveetil Sreelatha, Pune (IN); Manasi Patwardhan, Pune (IN); Shirish Subhash Karande, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 265 days.

(21) Appl. No.: 17/349,440

(22) Filed: Jun. 16, 2021

(65) Prior Publication Data
US 2022/0019734 A1 Jan. 20, 2022

(30) Foreign Application Priority Data
Jun. 17, 2020 (IN) .............................. 202021025582

(51) Int. Cl.
*G06V 10/25* (2022.01)
*G06F 16/583* (2019.01)
(Continued)

(52) U.S. Cl.
CPC .......... *G06V 10/25* (2022.01); *G06F 16/5846* (2019.01); *G06F 40/20* (2020.01);
(Continued)

(58) Field of Classification Search
CPC ........ G06V 10/25; G06V 20/20; G06V 10/82; G06V 20/62; G06V 10/764; G06F 16/5846; G06F 40/20; G06N 3/04
See application file for complete search history.

(56) References Cited

U.S. PATENT DOCUMENTS 11,341,366 B2 * 5/2022 Niu ..................... G06F 18/214
11,430,425 B2 * 8/2022 Patel ..................... G10L 13/086
(Continued)

OTHER PUBLICATIONS

Tan, Hao, and Mohit Bansal. "Lxmert: Learning cross-modality encoder representations from transformers." arXiv preprint arXiv: 1908.07490 (2019). (Year: 2019).*

(Continued)

*Primary Examiner* — Utpal D Shah
(74) *Attorney, Agent, or Firm* — Finnegan, Henderson, Farabow, Garrett & Dunner LLP

(57) ABSTRACT

This disclosure relates generally to visio-linguistic understanding. Conventional methods use contextual visio-linguistic reasoner for visio-linguistic understanding which requires more compute power and large amount of pre-training data. Embodiments of the present disclosure provide a method for visio-linguistic understanding using contextual language model reasoner. The method converts the visual information of an input image into a format that the contextual language model reasoner understands and accepts for a downstream task. The method utilizes the image captions and confidence score associated with the image captions along with a knowledge graph to obtain a combined input in a format compatible with the contextual language model reasoner. Contextual embeddings corresponding to the downstream task is obtained using the combined input. The disclosed method is used to solve several downstream tasks such as scene understanding, visual question answering, visual common-sense reasoning and so on.

11 Claims, 8 Drawing Sheets

(51) Int. Cl.
| | |
|---|---|
| *G06F 40/20* | (2020.01) |
| *G06V 20/62* | (2022.01) |
| *G06N 3/04* | (2023.01) |
| *G06V 10/82* | (2022.01) |
| *G06V 20/20* | (2022.01) |
| *G06V 10/764* | (2022.01) |
| *G06V 30/24* | (2022.01) |

(52) U.S. Cl.
CPC ............. *G06N 3/04* (2013.01); *G06V 10/764* (2022.01); *G06V 10/82* (2022.01); *G06V 20/20* (2022.01); *G06V 20/62* (2022.01); *G06V 30/24* (2022.01)

(56) References Cited

U.S. PATENT DOCUMENTS

| | | | | |
|---|---|---|---|---|
| 11,487,999 | B2* | 11/2022 | Le | G06N 3/045 |
| 11,562,147 | B2* | 1/2023 | Wang | G06F 18/21 |
| 11,620,814 | B2* | 4/2023 | Lai | G06V 20/00 |
| | | | | 707/769 |
| 2017/0206435 | A1* | 7/2017 | Jin | G06F 18/2431 |
| 2018/0121762 | A1* | 5/2018 | Han | G06F 18/214 |
| 2020/0320353 | A1* | 10/2020 | Yang | G06V 10/82 |
| 2020/0380027 | A1* | 12/2020 | Aggarwal | G06F 16/538 |
| 2021/0081728 | A1* | 3/2021 | Lai | G06N 3/045 |
| 2021/0303939 | A1* | 9/2021 | Hu | G06V 10/25 |
| 2022/0036108 | A1* | 2/2022 | Zhang | G06V 20/62 |
| 2022/0237263 | A1* | 7/2022 | Yamada | G06N 3/04 |

OTHER PUBLICATIONS

Alberti et al., "Fusion of Detected Objects in Text for Visual Question Answering," Computation and Language—Computer Vision and Pattern Recognition—Machine Learning (2019).

Lee et al., "ViLBERTScore: Evaluating Image Caption Using Vision-and-Language BERT," Proceedings of the First Workshop on Evaluation and Comparison of NLP Systems (2020).

Lu et al., "ViLBERT: Pretraining Task-Agnostic Visiolinguistic Representations for Vision-and-Language Tasks," Computer Vision and Pattern Recognition—Computation and Language (2019).

Song et al., "KVL-BERT: Knowledge Enhanced Visual-and-Linguistic BERT for Visual Commonsense Reasoning," Artificial Intelligence—Computation and Language (2020).

Su et al., "VL-BERT: Pre-Training of Generic Visual-Linguistic Representations," Computer Vision and Pattern Recognition—Computation and Language Machine Learning (2020).

* cited by examiner

METHOD AND SYSTEM FOR VISIO-LINGUISTIC UNDERSTANDING USING CONTEXTUAL LANGUAGE MODEL REASONERS

PRIORITY CLAIM

This US patent application claims priority under 35 U.S.C. § 119 to Indian provisional application no. 202021025582, filed on Jun. 17, 2020. The entire contents of the aforementioned application are incorporated herein by reference.

TECHNICAL FIELD

The disclosure herein generally relates to the field of artificial intelligence, and more particularly, to a method and system for visio-linguistic understanding using contextual language model reasoners.

BACKGROUND

Visio-linguistic understanding involves multi-modal problems as well as unimodal problems. The multi-modal problems comprise image-text matching, visual question answering, visual entailment, visual common-sense reasoning and so on. The unimodal problems involve image-pair matching, image retrieval with image queries and so on. Visio-linguistic understanding has applications in the fields of advertising, autonomous driving, retail, science, finance, etc.

Prior methods for visio-linguistic understanding creates contextual visio-linguistic reasoners by pre-training a contextual reasoner architecture on a large corpus of image and text data by extracting image region proposal vectors from the image and word embeddings from the text. Examples of contextual visio-linguistic reasoners include Vision and Language Bidirectional Encoder Representations from Transformers (ViLBERT), Visual-Linguistic BERT (VLBERT) and the like. Few other prior methods have used domain-specific architectures and utilized simple attention to associate image region proposal vectors and word embeddings of the text for visio-linguistic understanding in domain-specific tasks. Some prior methods have tried to use a contextual language model reasoner for visio-linguistic understanding by using visio-linguistic pre-training to adapt a contextual language model reasoner for visio-linguistic tasks or by using matrix multiplication with a trainable matrix to convert the image region-proposal vectors into size that is accepted by a contextual language model reasoner. Traditional approaches for visio-linguistic understanding involve using image proposal vectors from object detectors for images, word vectors for text, and converting the modalities to a common latent space. The conventional approaches for visio-linguistic understanding takes huge amount of computational power, memory and time.

SUMMARY

Embodiments of the present disclosure present technological improvements as solutions to one or more of the above-mentioned technical problems recognized by the inventors in conventional systems. For example, in one embodiment, a method for visio-linguistic understanding using contextual language model reasoners is provided.

In an aspect, there is provided a processor implemented method for visio-linguistic understanding using contextual language model reasoners. The method comprises: receiving an image and a text corresponding to the image, wherein the image comprises one or more embedded texts and wherein the image and the text correspond to a downstream task; converting using a first deep learning model, the image into (i) one or more image captions corresponding to the image (ii) a set of bounding box coordinate tuples, wherein each bounding box coordinate tuple from the set of bounding box coordinate tuples corresponds to one of the one or more image captions and (iii) a set of confidence scores wherein each confidence score from the set of confidence scores corresponds to one of the one or more image captions; extracting one or more extracted texts from the one or more embedded texts in the image using a second deep learning model; converting using a neural network, the set of bounding box coordinate tuples into a set of positional embeddings; ordering the one or more image captions based on (i) the set of confidence scores and (ii) a first set of predefined rules to obtain an ordered set of image captions; obtaining a set of ordered external knowledge texts using (i) the one or more image captions, (ii) the text (iii) the one or more extracted texts and (iv) an external knowledge graph; converting the one or more extracted texts, the ordered set of image captions and the set of ordered external knowledge texts into a combined input, wherein the combined input is in a format compatible with a contextual language model reasoner; and obtaining using the contextual language model reasoner, a set of contextual embeddings corresponding to the downstream task from the set of positional embeddings and the combined input.

In another aspect, there is provided a system for visio-linguistic understanding using contextual language model reasoners. The system comprises: memory storing instructions; one or more communication interfaces; and one or more hardware processors coupled to the memory via the one or more communication interfaces, wherein the one or more hardware processors are configured by the instructions to receive an image and a text corresponding to the image, wherein the image comprises one or more embedded texts and wherein the image and the text correspond to a downstream task; convert using a first deep learning model, the image into (i) one or more image captions corresponding to the image (ii) a set of bounding box coordinate tuples, wherein each bounding box coordinate tuple from the set of bounding box coordinate tuples corresponds to one of the one or more image captions and (iii) a set of confidence scores wherein each confidence score from the set of confidence scores corresponds to one of the one or more image captions; extract one or more extracted texts from the one or more embedded texts in the image using a second deep learning model; convert using a neural network, the set of bounding box coordinate tuples into a set of positional embeddings; order the one or more image captions based on (i) the set of confidence scores and (ii) a first set of predefined rules to obtain an ordered set of image captions; obtain a set of ordered external knowledge texts using (i) the one or more image captions, (ii) the text (iii) the one or more extracted texts and (iv) an external knowledge graph; convert the one or more extracted texts, the ordered set of image captions and the set of ordered external knowledge texts into a combined input, wherein the combined input is in a format compatible with a contextual language model reasoner; and obtain using the contextual language model reasoner, a set of contextual embeddings corresponding to the downstream task from the set of positional embeddings and the combined input.

In an embodiment, wherein ordering the one or more image captions to obtain the ordered set of image captions comprises: updating each image caption of the one or more image captions using the first set of predefined rules based on the confidence scores; and ordering each updated image captions in descending order based on the confidence score of each image captions.

In an embodiment, wherein updating each image caption using the first set of predefined rules based on confidence scores comprises: (i) For each image caption with confidence score greater than 80%, update each image captions with nothing; (ii) For each image caption with confidence score between 70% and 80%, update each image caption with a phrase "most likely"; (iii) For each image caption with confidence score between 50% and 69%, update each image caption with a phrase "might be"; (iv) For each image caption with confidence score between 40% and 49%, update each image caption with a phrase "there is a slight chance that"; (v) For each image caption with confidence score less than 40% ignore each image caption.

In an embodiment, wherein obtaining the set of ordered external knowledge texts comprises: extracting a set of concepts from the set of image captions and the text based on parts of speech of words in the set of image captions and the text; searching the external knowledge graph to obtain a set of knowledge texts corresponding to the set of concepts; and ordering the set of knowledge texts based on a predefined order to obtain the set of ordered external knowledge texts.

In an embodiment, wherein converting into the combined input comprises: ordering each of (i) the one or more extracted texts (ii) the ordered set of image captions and (iii) the set of ordered external knowledge texts based on the predefined order to obtain a combined input; and converting the combined input into the format corresponding to the contextual language model reasoner based on a vocabulary of the contextual language model reasoner and maximum input tokens of the contextual language model reasoner.

In yet another aspect, there are provided one or more non-transitory machine readable information storage mediums comprising one or more instructions which when executed by one or more hardware processors causes at least one of: receiving an image and a text corresponding to the image, wherein the image comprises one or more embedded texts and wherein the image and the text correspond to a downstream task; converting using a first deep learning model, the image into (i) one or more image captions corresponding to the image (ii) a set of bounding box coordinate tuples, wherein each bounding box coordinate tuple from the set of bounding box coordinate tuples corresponds to one of the one or more image captions and (iii) a set of confidence scores wherein each confidence score from the set of confidence scores corresponds to one of the one or more image captions; extracting one or more extracted texts from the one or more embedded texts in the image using a second deep learning model; converting using a neural network, the set of bounding box coordinate tuples into a set of positional embeddings; ordering the one or more image captions based on (i) the set of confidence scores and (ii) a first set of predefined rules to obtain an ordered set of image captions; obtaining a set of ordered external knowledge texts using (i) the one or more image captions, (ii) the text (iii) the one or more extracted texts and (iv) an external knowledge graph; converting the one or more extracted texts, the ordered set of image captions and the set of ordered external knowledge texts into a combined input, wherein the combined input is in a format compatible with a contextual language model reasoner; and obtaining using the contextual language model reasoner, a set of contextual embeddings corresponding to the downstream task from the set of positional embeddings and the combined input.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
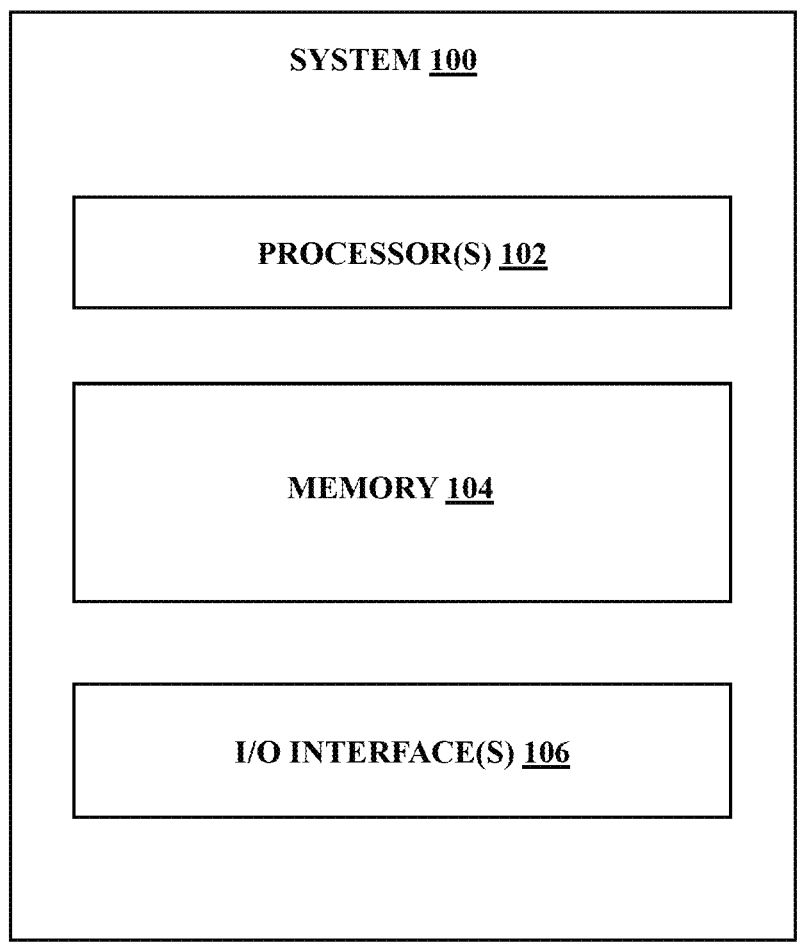
FIG. 1 illustrates an exemplary block diagram of a system for visio-linguistic understanding using contextual language model reasoners, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The disclosed method for visio-linguistic understanding uses a contextual language model reasoner for visio-linguistic understanding without any pre-training to be performed. Creation of a contextual visio-linguistic reasoner requires more compute power and pre-training data in terms of size compared to creation of the contextual language model reasoner. This is because to train the contextual visio-linguistic reasoner, it involves two kinds of data, image and text. Image data is much larger in terms of size than text data. Thus, to train the contextual visuo-linguistic reasoner would require much more GPU-memory and much longer pre-training time compared to the contextual language model reasoner.

The present disclosure utilizes contextual language model reasoners for visio-linguistic understanding. Contextual language model reasoners are traditionally used for language understanding tasks. Contextual reasoners, however, have been used for visio-linguistic understanding. They typically perform visio-linguistic understanding by using object detectors which converts the image input to regions of interest and extracts features from those regions of interest. These features are jointly trained with the textual input on a large corpus of data creating a contextual visio-linguistic reasoner. However, the present disclosure uses a contextual language model reasoner such as Bidirectional Encoder Representations from Transformers (BERT) as a contextual visio-linguistic reasoner. The method converts the visual information into a format that the contextual language model reasoner understands and accepts.

Text data is mostly limited to the vocabulary of the language being used. A contextual language model reasoner which is trained on a large corpus of data will have good knowledge and a good understanding of the vocabulary of the language. Moreover, text is limited by a grammar. So, there is less scope for variety with text when the contextual language model reasoner is being used for downstream tasks. Whereas image data can have a large degree of variation as images can be very subjective and there is no limitation on how an image can be and how an image cannot be. So even if a contextual visio-linguistic reasoner is trained on very large amounts of data (which again, requires huge amounts of compute power and training time), there is still a lot of scope for variation in the images in the downstream task. Both contextual visio-linguistic reasoner and contextual language model reasoners are neural networks and neural networks do not perform well if test data varies much from the data it is trained on. This makes a contextual language model reasoner better suited as a general-purpose model.

The embodiments herein provide a method and system for visio-linguistic understanding using contextual language model reasoners. The method for visio-linguistic understanding can solve not only multi-modal problems such as image-text matching, visual question answering, visual entailment, visual common-sense reasoning and so on, but also unimodal problems of image-pair matching, image retrieval with image queries and so on.

In an embodiment, the contextual language model reasoner may alternatively referred as a language model. The contextual language model reasoner is an architecture containing multiple layers of attention to form contextual embeddings of an input and is pre-trained on a large text corpus.

Referring now to the drawings, and more particularly to FIG. 1 through FIG. 6, where similar reference characters denote corresponding features consistently throughout the figures, there are shown preferred embodiments and these embodiments are described in the context of the following exemplary system and/or method.

FIG. 1 illustrates an exemplary block diagram of a system 100 for visio-linguistic understanding using contextual language model reasoners, according to some embodiments of the present disclosure. In an embodiment, the system 100 includes one or more processors 102, communication interface device(s) or input/output (I/O) interface(s) 106, and one or more data storage devices or memory 104 operatively coupled to the one or more processors 102. The one or more processors 102 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In the context of the present disclosure, the expressions 'processors' and 'hardware processors' may be used interchangeably. In an embodiment, the system 100 can be implemented in a variety of computing systems, such as laptop computers, notebooks, hand-held devices, workstations, mainframe computers, servers, a network cloud and the like.

The I/O interface (s) 106 may include a variety of software and hardware interfaces, for example, a web interface, a graphical user interface, and the like and can facilitate multiple communications within a wide variety of networks and protocol types, including wired networks, for example, LAN, cable, etc., and wireless networks, such as WLAN, cellular, or satellite. In an embodiment, the I/O interface(s) can include one or more ports for connecting a number of devices to one another or to another server.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system for visio-linguistic understanding using contextual language model reasoners may be stored in the memory 104.

Figure 2:
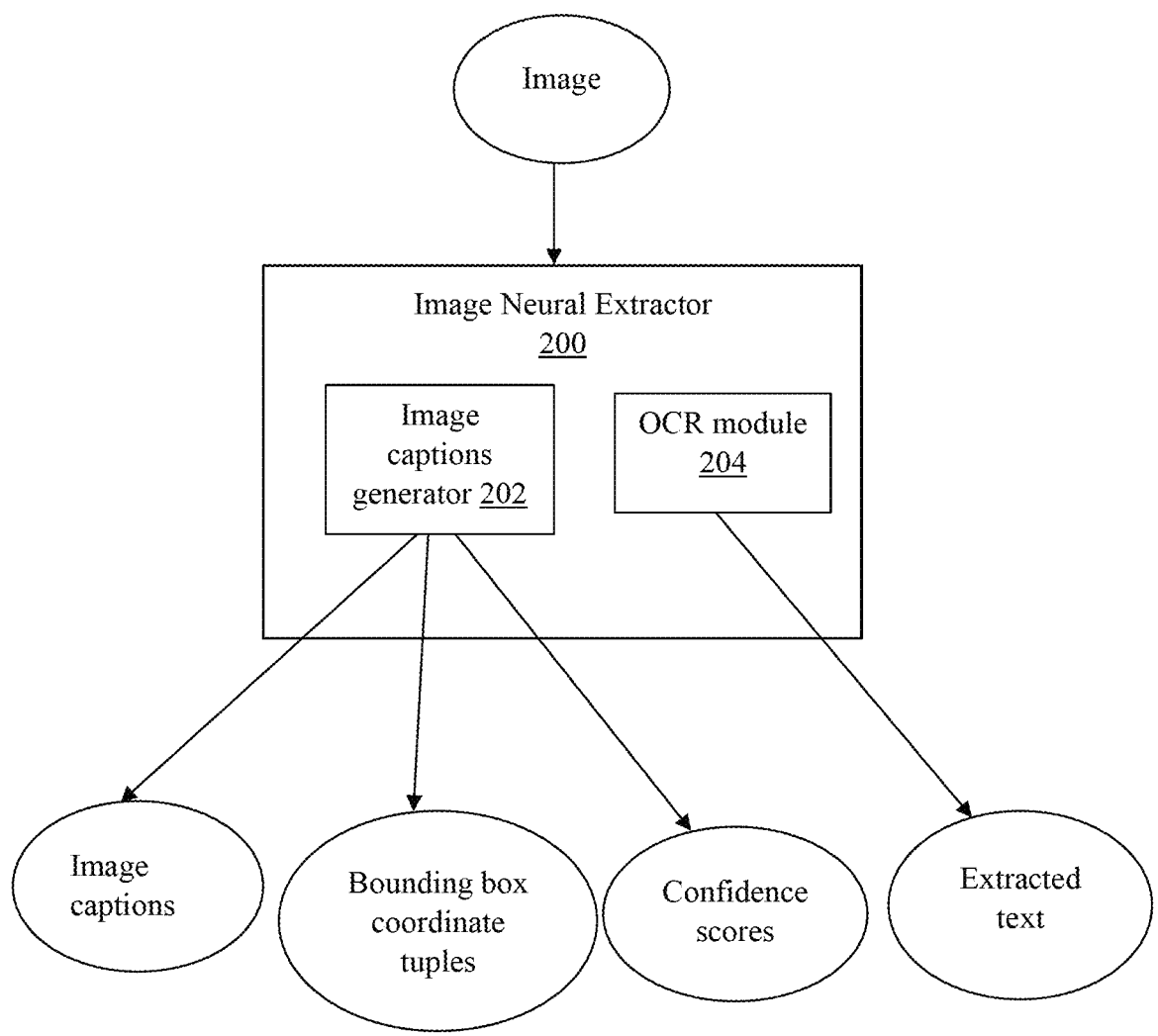
FIG. 2 is an exemplary block diagram of an image neural extractor module for visio-linguistic understanding using contextual language model reasoners, according to embodiments of the present disclosure
Figure 3:
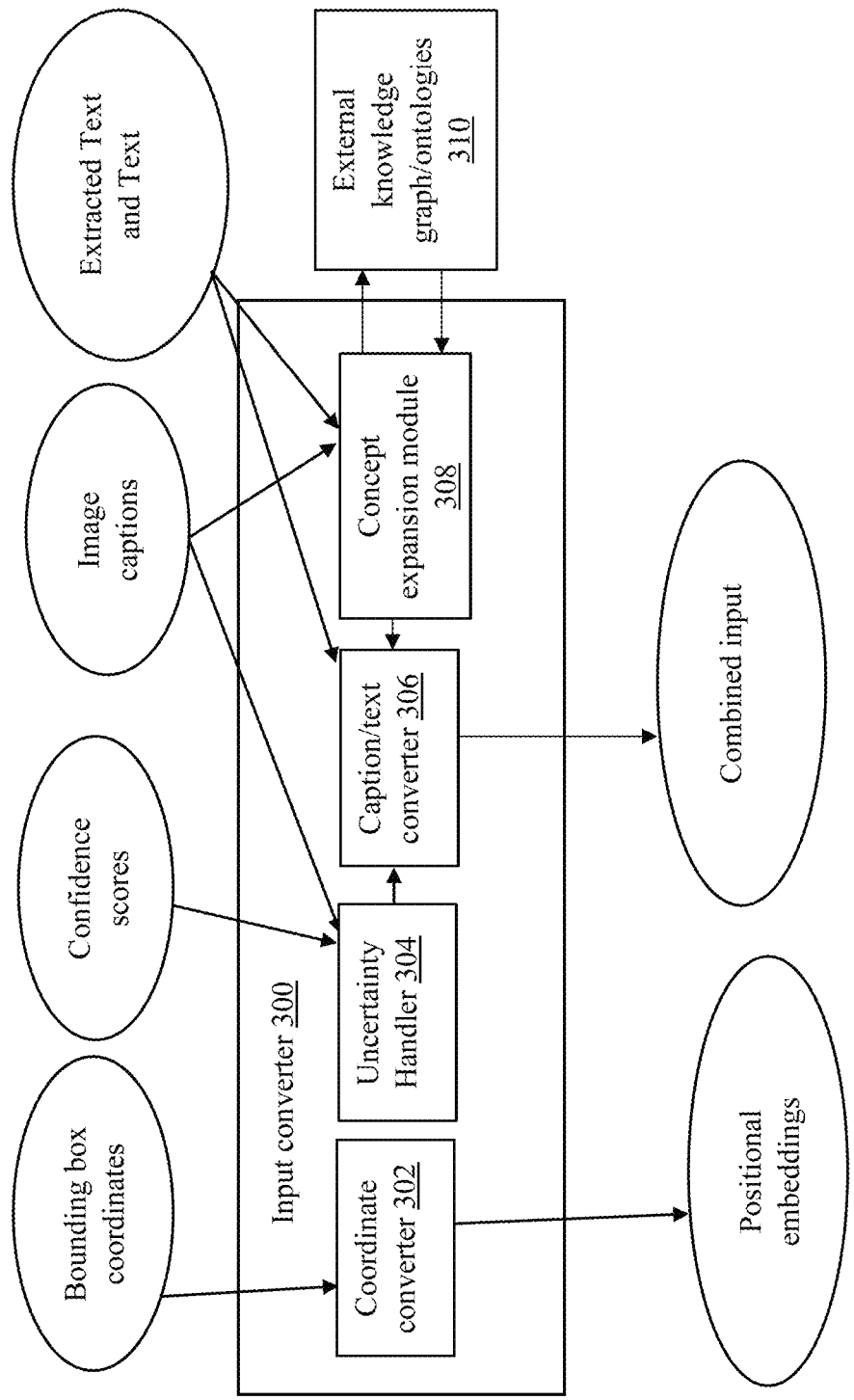
FIG. 3 is an exemplary block diagram of an input converter module for visio-linguistic understanding using contextual language model reasoners, according to embodiments of the present disclosure.
Figure 4:
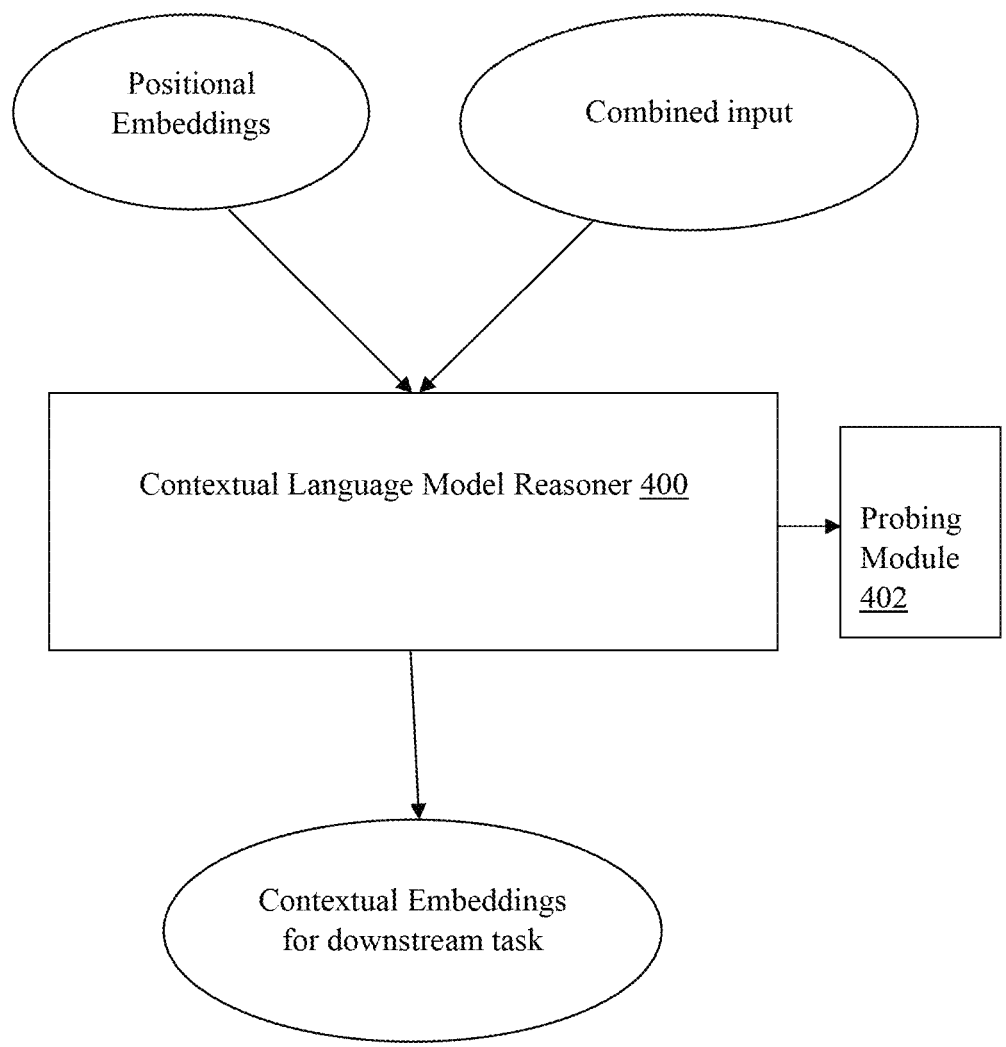
FIG. 4 is an exemplary block diagram of a contextual model reasoner for visio-linguistic understanding using contextual language model reasoners, according to embodiments of the present disclosure FIG. 5A through FIG. 5C is an exemplary flow diagram illustrating a method for visio-linguistic understanding using contextual language model reasoners, according to embodiments of the present disclosure.

The plurality of modules to perform the methodology for visio-linguistic understanding using contextual language model reasoners are further explained in conjunction with FIG. 2 through FIG. 4. The methodology for visio-linguistic understanding using contextual language model reasoners are further explained in conjunction with FIG. 5A through FIG. 5C.

FIG. 2 is an exemplary block diagram of an image neural extractor module 200 for visio-linguistic understanding using contextual language model reasoners, according to embodiments of the present disclosure The image neural extractor module 200 comprises two components, image captions generator 202 and optical character recognition (OCR) module 204. The input provided to the image neural extractor module 200 is an image of a downstream task. The image comprises embedded text. The image is converted into image captions, bounding box coordinates, confidence scores using the image captions generator 202. The output of the OCR module 204 is extracted text. There exist several object detector and caption generators such as DenseCap, Faster-Region based convolutional neural networks (RCNN) which can be used off-the-shelf to get the image captions with bounding box coordinates and confidence scores. Off-the-shelf OCR modules are used to detect text in the image. For example, Google Vision API which is provided as a web service, tesseract and so on.

FIG. 3 is an exemplary block diagram of an input converter module 300 for visio-linguistic understanding using contextual language model reasoners, according to embodiments of the present disclosure.

The input converter module 300 comprises four components, a coordinate converter 302, an uncertainty handler 304, a caption/text converter 306 and a concept expansion module 308. The output from the image neural extractor module 200 is provided as input to the input converter module 300. The output of the input converter module 300 are positional embeddings and combined input which is in language model format. The positional embeddings and the combined input are obtained using the components of the input converter module 300 in association with external knowledge graphs/ontologies 310. The external knowledge graph comprises real-world knowledge organized in the form of a graph of which each node represents a real-world concept and edges represent a relationship between the real world concept with other concepts. A triplet (node, edge, node) is formed wherein, each triplet forms a sentence that relates two concepts. Ontologies represent domain specific knowledge of various domains arranged in a graph structure. Few examples of external knowledge graphs are Concept-Net, Cyc, dbpedia, Wiki.

FIG. 4 is an exemplary block diagram of a contextual model reasoner 400 for visio-linguistic understanding using contextual language model reasoners, according to embodiments of the present disclosure.

The output from the input converter module 300 is provided as input to the contextual language model reasoner 400. The output of the contextual language model reasoner 400 are contextual embeddings for downstream task, wherein the contextual embeddings is validated by providing the same into a neural network architecture. Probing Module 402 comprises of probing methods that act on attention weights at various layers of the language model to identify the reasoning steps followed by the language model in obtaining the contextual embeddings.

Figure 5A:
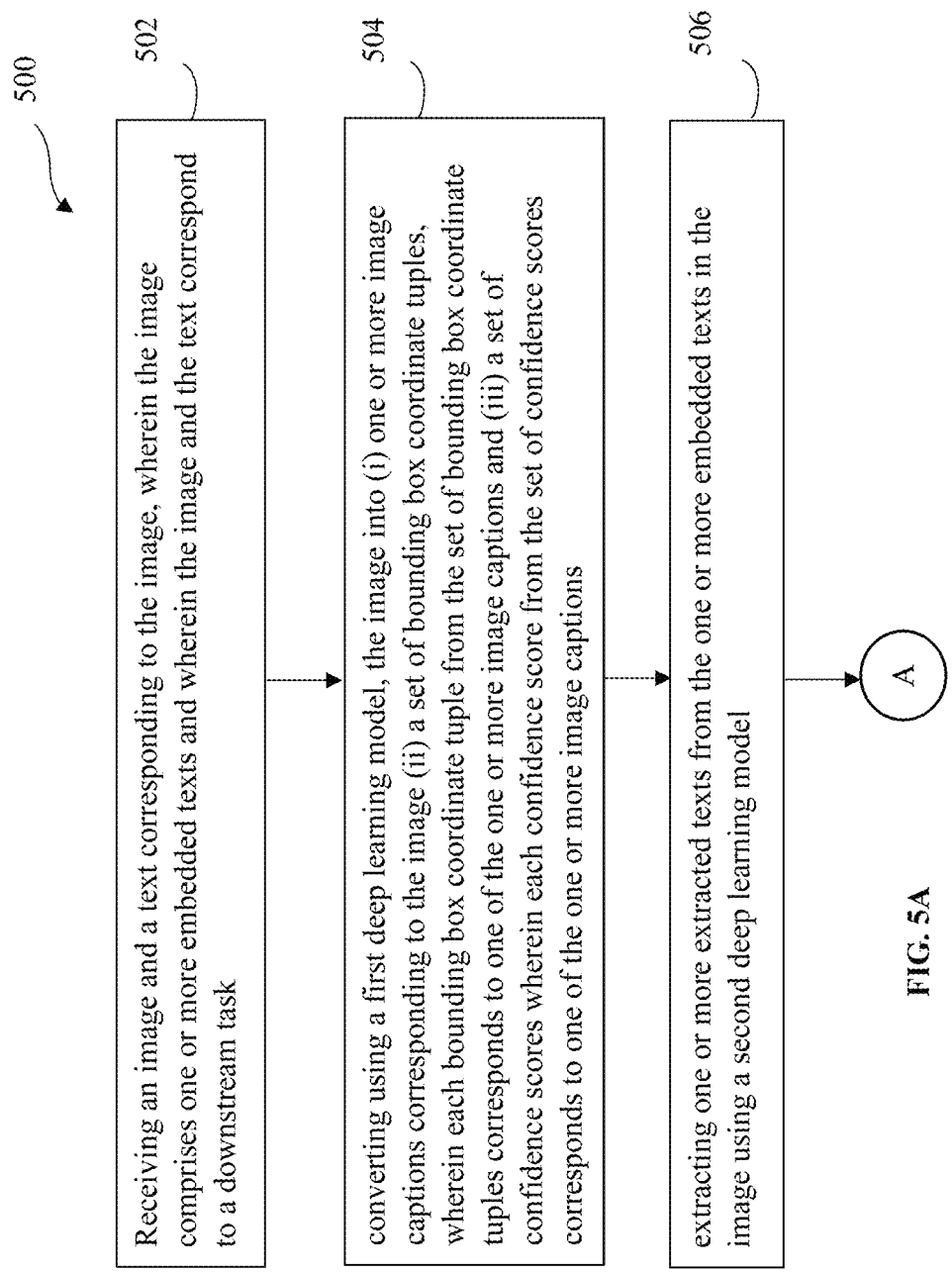
Figure 5B:
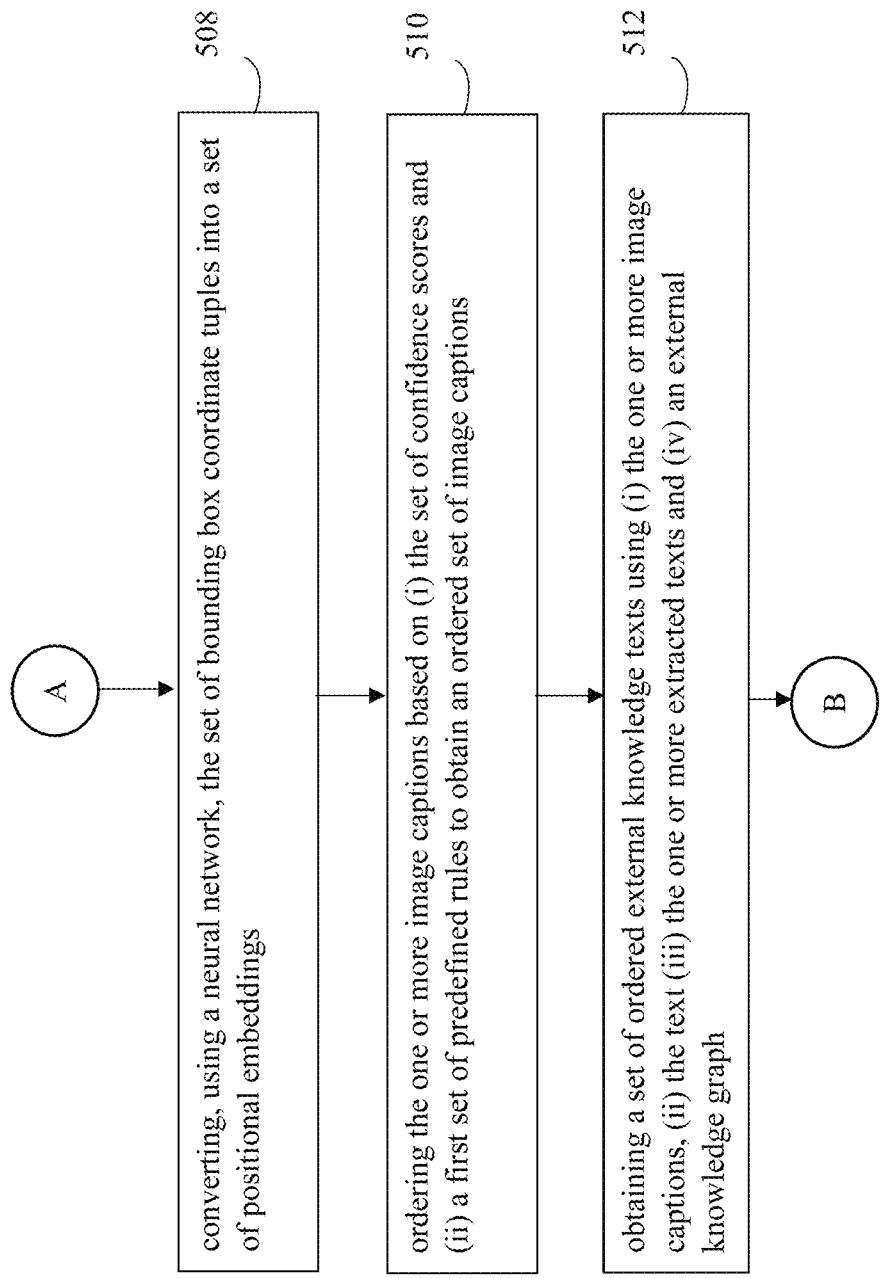
Figure 5C:
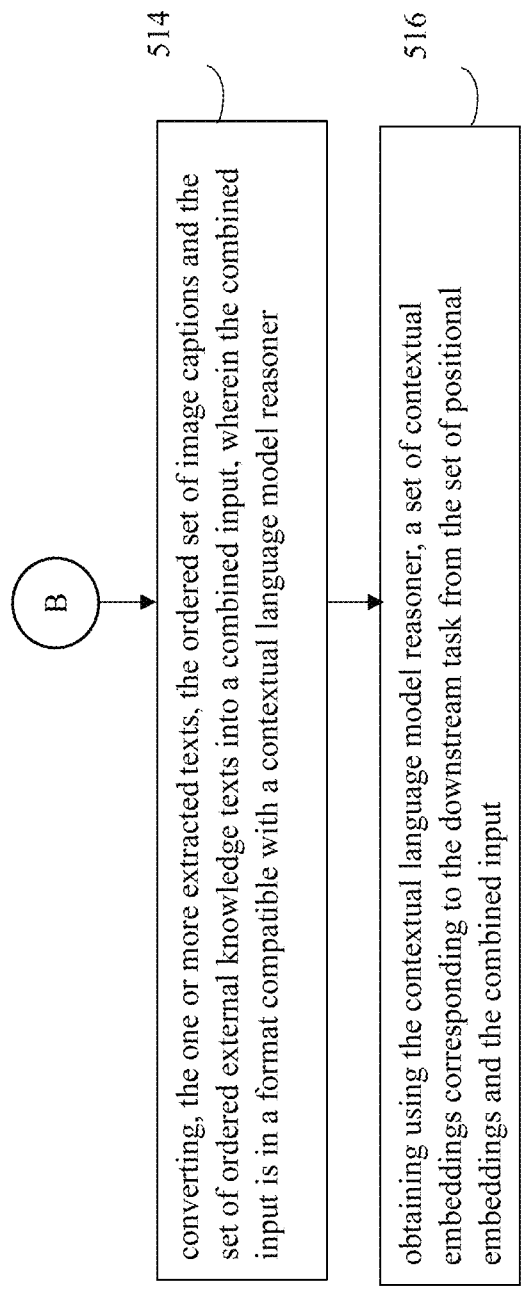

FIG. 5A through FIG. 5C is an exemplary flow diagram illustrating a method for visio-linguistic understanding using contextual language model reasoners, according to embodiments of the present disclosure. In an embodiment, the system 100 comprises one or more data storage devices or the memory 104 operatively coupled to the one or more hardware processors 102 and is configured to store instructions for execution of steps of the method by the one or more processors 102. The steps of the method 500 of the present disclosure will now be explained with reference to components of the system 100 of FIG. 1.

Figure 6:
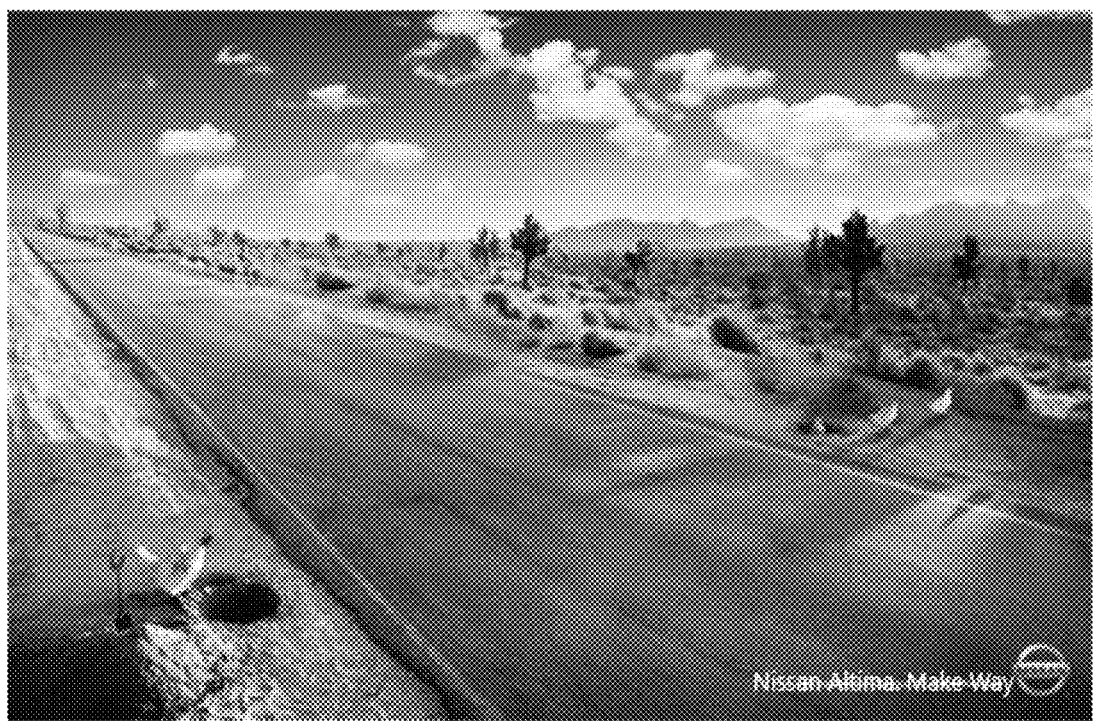
FIG. 6 illustrates an example image for visio-linguistic understanding using contextual language model reasoners, in accordance with some embodiments of the present disclosure.

In an embodiment of the present disclosure, the one or more processors 102 are configured to receive, at step 502, an image and a text corresponding to the image, wherein the image comprises one or more embedded texts and wherein the image and the text correspond to a downstream task. Considering an example of the downstream task as advertisement understanding, the advertisement image and an interpretation of the advertisement image in text form is provided as input to the system. Considering another example of the downstream task as autonomous driving, a scene image and a question corresponding to the scene image is provided as input to the system. FIG. 6 illustrates an example image for visio-linguistic understanding using contextual language model reasoners, in accordance with some embodiments of the present disclosure. The downstream task for the example image is advertisement understanding. The example image comprises the embedded texts "Nissan Altima. Make way" and "NISSAN".

In an embodiment of the present disclosure, the one or more processors 102 are configured to convert, at step 504 using a first deep learning model, the image into (i) one or more image captions corresponding to the image (ii) a set of bounding box coordinate tuples, wherein each bounding box coordinate tuple from the set of bounding box coordinate tuples corresponds to one of the one or more image captions and (iii) a set of confidence scores wherein each confidence score from the set of confidence scores corresponds to one of the one or more image captions. The image captions generator 202 is a neural network that generates the one or more image captions which describe objects in the image, their attributes, state, relations between objects and attributes and relation between objects, actions being performed, and the scene depicted in the image. The image captions generator 202 also generates the set of bounding box coordinate tuples for the corresponding image captions and the set of confidence score of detection of objects in the image. A neural network for object detection can be created in a variety of ways. It can include feed forward network layers, convolutional layers, transformer layers, recurrent neural networks layers, etc. or any combination of these. These neural networks are typically trained with supervision on a large corpus of data to generate the required image captions. Some of these networks are available off-the-shelf. For example, Densecap, Faster RCNN, Mask RCNN networks. Different neural extractors may provide different kinds of image captions.

Considering the example image of FIG. 6, the image captions, the bounding box tuples, and the confidence scores from the image captions generator module is given below in Table 1:

TABLE 1

| Image captions | Bounding box tuples | Confidence scores |
|---|---|---|
| The sky is clear. | [0, 50, 15, 100] | 85% |
| There are mountains to the far right | [50, 38, 5, 50] | 75% |
| There is a long road in the middle | [0, 40, 40, 100] | 100% |
| There are trees and shrubs on the right side of the road | [0, 40, 25, 100] | 90% |
| There is a white chicken on the left side of the road | [12, 14, 5, 4] | 88% |
| There are two white chicken walking to the left on the left side of the road | [75, 25, 5, 9] | 82% |
| There is a small pit in front of the chicken on the left | [15, 10, 4, 5] | 72% |
| There is a heap of sand beside the chicken on the left | [20, 12, 5, 8] | 78% |
| There is a chicken in a pit on the right side of the road | [75, 22, 2, 4] | 55% |
| There is a metal ring in the middle of the road to the right | [92, 5, 3, 4] | 36% |

In an embodiment of the present disclosure, the one or more processors 102 are configured to extract, at step 506, one or more extracted texts from the one or more embedded texts in the image using a second deep learning model. The second deep learning model is an OCR module 204 that identifies and extracts an extracted text from the embedded text in the image. The OCR module 204 is also a neural network which include feed forward network layers, convolutional layers, transformer layers, recurrent neural networks layers, etc. or any combination of these. They are typically trained on a large corpus of data to detect text in images. These are also available off-the-shelf. For example, the extracted text from the example image in FIG. 6 are "Nissan Altima. Make Way" and "NISSAN".

In an embodiment of the present disclosure, the one or more processors 102 are configured to convert, at step 508, using a neural network, the set of bounding box coordinate tuples into a set of positional embeddings. The coordinate converter 302 of the input converter module 300 converts the set of bounding box coordinate tuples for the corresponding image captions into the set of positional embeddings used by the contextual language model reasoner for language understanding. The coordinate converter 302 is a neural network which is trainable and converts the 4 dimensional bounding box coordinate tuples into a vector whose length is equal to the length of word vectors used by the contextual language model reasoner. These converted bounding box tuple vectors are then added to the corresponding word vectors to add the information of the bounding box to the contextual language model reasoner.

In an embodiment of the present disclosure, the one or more processors 102 are configured to order, at step 510, the one or more image captions based on (i) the set of confidence scores and (ii) a first set of predefined rules to obtain an ordered set of image captions. The ordering of the one or more image captions to obtain the ordered set of image captions comprises updating each image caption of the one or more image captions using the first set of predefined rules based on the confidence scores and ordering each updated image captions in descending order based on the confidence score of each image captions. The method updates each image caption using the first set of predefined rules based on confidence scores. The first set of predefined rules for updating the image captions are given as below:
  (i) For each image caption with confidence score greater than 80%, update each image captions with nothing
  (ii) For each image caption with confidence score between 70% and 80%, update each image caption with a phrase "most likely"
  (iii) For each image caption with confidence score between 50% and 69%, update each image caption with a phrase "might be"
  (iv) For each image caption with confidence score between 40% and 49%, update each image caption with a phrase "there is a slight chance that"
  (v) For each image caption with confidence score less than 40% ignore each image caption.

For example, the image caption "There is a chicken in a pit on the right side of the road" in Table 1, the confidence score is 55%. According to the first set of predefined rules provided above, the image caption is updated to "There might be a chicken in a pit on the right side of the road".

The uncertainty handler 304 takes in the confidence scores which is the output of the image captions generator 202 and provides an ordering and vocabulary to be used by the caption/text converter 306. The caption/text converter 306 orders the image captions in decreasing order of the confidence scores to minimize information loss if the captions do not fit in a limited input sentence length of the contextual language model reasoner. The vocabulary output reflects the uncertainty in detection of object and through this vocabulary the uncertainty information is passed to the contextual language model reasoner. The caption/text converter 306 split all the image captions and the extracted text into its constituent words. If a word is not present in the vocabulary of the contextual language model reasoner, it is converted or split into words that are present in the vocabulary according to what has been done during the training of the contextual language model reasoner.

In an embodiment of the present disclosure, the one or more processors 102 are configured to obtain, at step 512, a set of ordered external knowledge texts using (i) the one or more image captions, (ii) the text (iii) the one or more extracted texts and (iv) an external knowledge graph. In an embodiment of the present disclosure method, the set of ordered external knowledge texts are obtained by extracting a set of concepts from the set of image captions, the one or more extracted texts and the text based on parts of speech of words in the set of image captions, the one or more extracted texts and the text. The parts of speech of words in the set of image captions, the one or more extracted texts and the text is identified using existing natural language libraries. The concept expansion module 308 extracts concepts from the text and the one or more extracted texts corresponding to the downstream task. The concepts extracted are proper nouns, common nouns, adjectives, adverbs, verbs and pronouns. Examples of concepts extracted with respect to the example image of FIG. 6 are Nissan Altima, road, way, sky, mountains, pit, heap of sand, trees and shrubs, white, clear and walking. The method queries the external knowledge graph and ontologies module with the extracted concepts. For each concept, the external knowledge graph and ontologies module outputs a set of knowledge texts. Examples of external knowledge text with respect to the example image of FIG. 6 is given below in Table II:

TABLE II

| Concept | External Knowledge Text |
|---|---|
| Nissan | Nissan is a car brand |
| Road | Vehicles travel on roads |
| White | White is a symbol of peace |
| Trees and Shrubs | Trees and shrubs signify nature |
| Heap of Sand | Heaps of sand are found in deserts. Heap of sand can indicate digging. |
| Walking | Walking indicates going somewhere. Walking is good for health. |

In an embodiment, the set of knowledge sentences are further ordered based on a predefined order to obtain the set of ordered knowledge texts. The predefined order is in accordance with the concepts proper nouns, common nouns, adjectives, verbs and pronouns wherein the extracted knowledge sentences corresponding to the concept proper nouns comes first in the order, the extracted knowledge sentences corresponding to the concept common nouns comes second in the order and the like.

In an embodiment of the present disclosure, the one or more processors 102 are configured to convert, at step 514, the one or more extracted texts, the ordered set of image captions and the set of ordered external knowledge texts into a combined input, wherein the combined input is in a format compatible with a contextual language model reasoner 400. In an embodiment, the combined input is converted by ordering each of (i) the one or more extracted texts (ii) the ordered set of image captions and (iii) the set of ordered external knowledge texts based on the predefined order corresponding to the concepts to obtain a combined input. Further the combined input is converted into a format compatible with the contextual language model reasoner based on a vocabulary of the contextual language model reasoner and maximum input tokens of the contextual language model reasoner. There is a dictionary of words which form the vocabulary of the contextual language model reasoner. Every sentence is split into its constituent words using space, comma, exclamation and so on. Further for each word dictionary is searched to check if the word is present in it. If a word is present, it is converted into a corresponding token. (Every word in dictionary is assigned a number which is referred to as token corresponding to that word) If a word is not present, the word is split into sub-words by finding a word in the dictionary that gives the longest sequence match. For the remaining part after separating the longest sequence match, this is repeated until the whole word is consumed.

In an embodiment of the present disclosure, the one or more processors 102 are configured to obtain, at step 516, a set of contextual embeddings corresponding to the downstream task from the set of positional embeddings and the combined input using the contextual language model reasoner 400. In an embodiment, a set of text may be provided such that the contextual embeddings for the downstream task will be used to choose one of the options from the given set of text. For example, consider the set of text provided for the example image of FIG. 6 as given below:

(a) Chickens are crossing the road by walking on the road to make way.

(b) Chickens are crossing the road by flying above it to make way.

(c) Chickens are crossing the road by digging a tunnel underground to make way.

(d) Chickens are crossing the road in a car to make way.

The contextual embeddings obtained from the contextual language model reasoner is used to choose one of the options from this set. The text corresponding to the image is validated by providing the contextual embeddings obtained for the downstream task into a neural network architecture. Thus, in the example the four contextual embeddings obtained from the contextual language model reasoner can be fed into a feed forward network with four output neurons for four options to predict the correct option for the downstream task of scene understanding.

In another embodiment, only a question will be provided as text. In this case contextual embeddings are used to generate the answer sentence. For example, if the text provided for the example image of FIG. 6 is "What are the chickens doing to Make way?". The contextual embeddings obtained is used to generate answer for the given question using a neural network architecture.

The present disclosed method herein uses existing contextual language model reasoner directly for visio-linguistic understanding. The method adjusts the input in such a way that existing contextual language model reasoner handle multi-modal problems. The method handles confidence or uncertainty of object detection or the spatial information of objects given by an object detector. The method uses an external knowledge graph to complement the input information which lead to performance improvement compared to prior approaches.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for visio-linguistic understanding using contextual language model reasoners, the method comprising:

receiving, via one or more hardware processors, an image and a text corresponding to the image, wherein the image comprises one or more embedded texts and wherein the image and the text correspond to a downstream task;

converting, via the one or more hardware processors, using a first deep learning model, the image into (i) one or more image captions corresponding to the image (ii) a set of bounding box coordinate tuples, wherein each bounding box coordinate tuple from the set of bounding box coordinate tuples corresponds to one of the one or more image captions and (iii) a set of confidence scores wherein each confidence score from the set of confidence scores corresponds to one of the one or more image captions;

extracting, via the one or more hardware processors, one or more extracted texts from the one or more embedded texts in the image using a second deep learning model;

converting, via the one or more hardware processors, using a neural network, the set of bounding box coordinate tuples into a set of positional embeddings;

ordering, via the one or more hardware processors, the one or more image captions based on (i) the set of confidence scores and (ii) a first set of predefined rules to obtain an ordered set of image captions;

obtaining, via the one or more hardware processors, a set of ordered external knowledge texts using (i) the one or more image captions, (ii) the text (iii) the one or more extracted texts and (iv) an external knowledge graph;

converting, via the one or more hardware processors, the one or more extracted texts, the ordered set of image captions and the set of ordered external knowledge texts into a combined input, wherein the combined input is in a format compatible with a contextual language model reasoner; and obtaining, via the one or more hardware processors, using the contextual language model reasoner, a set of contextual embeddings corresponding to the downstream task from the set of positional embeddings and the combined input.

2. The processor implemented method as claimed in claim 1, wherein ordering the one or more image captions to obtain the ordered set of image captions comprises:
updating each image caption of the one or more image captions using the first set of predefined rules based on the confidence scores; and
ordering each updated image captions in descending order based on the confidence score of each image captions.

3. The processor implemented method as claimed in claim 1, wherein updating each image caption using the first set of predefined rules based on confidence scores comprises:
(i) For each image caption with confidence score greater than 80%, update each image captions with nothing;
(ii) For each image caption with confidence score between 70% and 80%, update each image caption with a phrase "most likely";
(iii) For each image caption with confidence score between 50% and 69%, update each image caption with a phrase "might be";
(iv) For each image caption with confidence score between 40% and 49%, update each image caption with a phrase "there is a slight chance that";
(v) For each image caption with confidence score less than 40% ignore each image caption.

4. The processor implemented method as claimed in claim 1, wherein obtaining the set of ordered external knowledge texts comprises:
extracting a set of concepts from the set of image captions and the text based on parts of speech of words in the set of image captions and the text;
searching the external knowledge graph to obtain a set of knowledge texts corresponding to the set of concepts; and
ordering the set of knowledge texts based on a predefined order to obtain the set of ordered external knowledge texts.

5. The processor implemented method as claimed in claim 1, wherein converting into the combined input comprises:
ordering each of (i) the one or more extracted texts (ii) the ordered set of image captions and (iii) the set of ordered external knowledge texts based on the predefined order to obtain a combined input; and
converting the combined input into the format corresponding to the contextual language model reasoner based on a vocabulary of the contextual language model reasoner and maximum input tokens of the contextual language model reasoner.

6. A system, comprising:
a memory storing instructions;
one or more communication interfaces; and
one or more hardware processors coupled to the memory via the one or more communication interfaces, wherein the one or more hardware processors are configured by the instructions to:
receive an image and a text corresponding to the image, wherein the image comprises one or more embedded texts and wherein the image and the text correspond to a downstream task;
convert using a first deep learning model, the image into (i) one or more image captions corresponding to the image (ii) a set of bounding box coordinate tuples, wherein each bounding box coordinate tuple from the set of bounding box coordinate tuples corresponds to one of the one or more image captions and (iii) a set of confidence scores wherein each confidence score from the set of confidence scores corresponds to one of the one or more image captions;
extract one or more extracted texts from the one or more embedded texts in the image using a second deep learning model;
convert using a neural network, the set of bounding box coordinate tuples into a set of positional embeddings;
order the one or more image captions based on (i) the set of confidence scores and (ii) a first set of predefined rules to obtain an ordered set of image captions;
obtain a set of ordered external knowledge texts using (i) the one or more image captions, (ii) the text and (iii) an external knowledge graph;
convert the one or more extracted texts, the ordered set of image captions and the set of ordered external knowledge texts into a combined input, wherein the combined input is in a format compatible with a contextual language model reasoner; and
obtain using the contextual language model reasoner, a set of contextual embeddings corresponding to the downstream task from the set of positional embeddings and the combined input.

7. The system of claim 6, wherein ordering the one or more image captions to obtain the ordered set of image captions comprises:
updating each image caption of the one or more image captions using the first set of predefined rules based on the confidence scores; and
ordering each updated image captions in descending order based on the confidence score of each image captions.

8. The system of claim 6, wherein updating each image caption using the first set of predefined rules based on confidence scores comprises:
- (vi) For each image caption with confidence score greater than 80%, update each image captions with nothing
- (vii) For each image caption with confidence score between 70% and 80%, update each image caption with a phrase "most likely"
- (viii) For each image caption with confidence score between 50% and 69%, update each image caption with a phrase "might be"
- (ix) For each image caption with confidence score between 40% and 49%, update each image caption with a phrase "there is a slight chance that"
- (x) For each image caption with confidence score less than 40% ignore each image caption.

9. The system of claim 6, wherein obtaining the set of ordered external knowledge texts comprises:
- extracting a set of concepts from the set of image captions and the text based on parts of speech of words in the set of image captions and the text;
- searching the external knowledge graph to obtain a set of knowledge texts corresponding to the set of concepts; and
- ordering the set of knowledge texts based on a predefined order to obtain the set of ordered external knowledge texts.

10. The system of claim 6, wherein converting into the combined input comprises:
- ordering each of (i) the one or more extracted texts (ii) the ordered set of image captions and (iii) the set of ordered external knowledge texts based on the predefined order to obtain a combined input; and
- converting the combined input into the format corresponding to the contextual language model reasoner based on a vocabulary of the contextual language model reasoner and maximum input tokens of the contextual language model reasoner.

11. One or more non-transitory machine readable information storage mediums comprising one or more instructions, which when executed by one or more hardware processors causes a method for:
- receiving an image and a text corresponding to the image, wherein the image comprises one or more embedded texts and wherein the image and the text correspond to a downstream task;
- converting using a first deep learning model, the image into (i) one or more image captions corresponding to the image (ii) a set of bounding box coordinate tuples, wherein each bounding box coordinate tuple from the set of bounding box coordinate tuples corresponds to one of the one or more image captions and (iii) a set of confidence scores wherein each confidence score from the set of confidence scores corresponds to one of the one or more image captions;
- extracting one or more extracted texts from the one or more embedded texts in the image using a second deep learning model;
- converting using a neural network, the set of bounding box coordinate tuples into a set of positional embeddings;
- ordering the one or more image captions based on (i) the set of confidence scores and (ii) a first set of predefined rules to obtain an ordered set of image captions;
- obtaining a set of ordered external knowledge texts using (i) the one or more image captions, (ii) the text (iii) the one or more extracted texts and (iv) an external knowledge graph;
- converting the one or more extracted texts, the ordered set of image captions and the set of ordered external knowledge texts into a combined input, wherein the combined input is in a format compatible with a contextual language model reasoner; and
- obtaining using the contextual language model reasoner, a set of contextual embeddings corresponding to the downstream task from the set of positional embeddings and the combined input.

\* \* \* \* \*